(No Model.)

H. A. LEHER.
COFFEE ROASTER.

No. 245,001. Patented Aug. 2, 1881.

WITNESSES
INVENTOR

UNITED STATES PATENT OFFICE.

HENRY A. LEHER, OF CAPE GIRARDEAU, MISSOURI.

COFFEE-ROASTER.

SPECIFICATION forming part of Letters Patent No. 245,001, dated August 2, 1881.

Application filed April 13, 1881. (No model.)

*To all whom it may concern:*

Be it known that I, HENRY A. LEHER, of Cape Girardeau, in the county of Cape Girardeau and State of Missouri, have invented certain new and useful Improvements in Coffee-Roasters; and I do hereby declare that the following is a full, clear, and exact description of the invention, which will enable others skilled in the art to which it appertains to make and use the same, reference being had to the accompanying drawings, which form a part of this specification, and in which—

Figure 1:
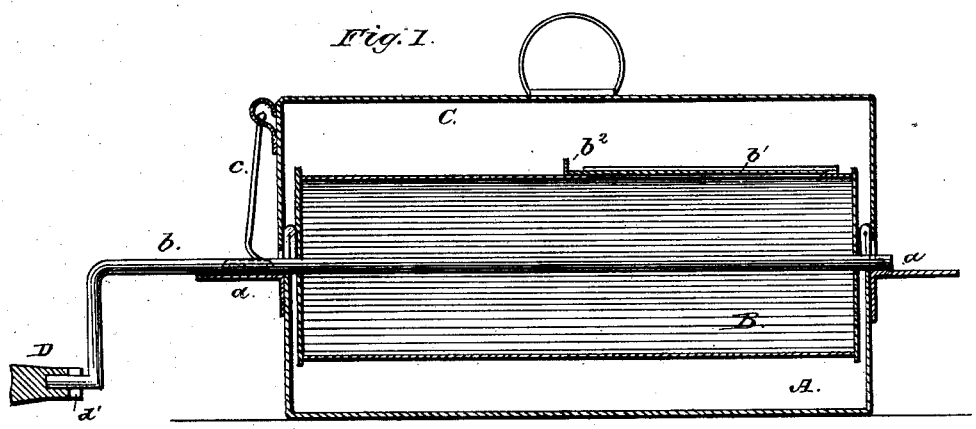
Figure 2:
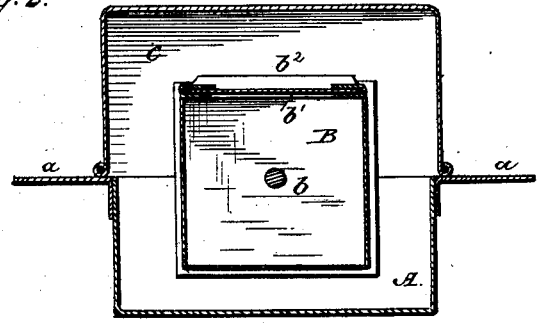
Figure 3:
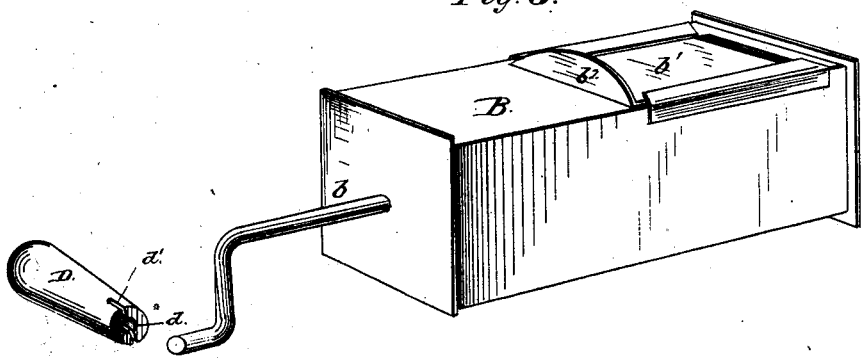

Figure 1 is a longitudinal section of my coffee-roaster. Fig. 2 is a cross-section of the same; and Fig. 3 is a perspective view of a cylinder or protector for application to the roaster-shaft and to the opening and closing lid or slide of the roaster.

This invention relates to improvements in coffee-roasters; and the novelty consists in the construction and arrangement of parts, as will be more fully hereinafter set forth, and specifically pointed out in the claim.

Referring to the accompanying drawings, A indicates a pan with a marginal flange, $a$, of such width as to span the widest space between the pan and the stove, and to rest upon the stove to support the pan in position over and directly in contact with the fire.

B is the roasting-cylinder for holding the coffee for roasting, rectangular in shape, to effect, when in motion or revolved, the constant precipitation or agitation and the thorough and uniform roasting of the coffee, and hung detachably in its pan A by means of a crank or handled shaft, $b$. A slide or lid, $b'$, with a lip, $b^2$, opens and closes the cylinder where the coffee is put in and taken out.

C is a cover hinged to the flange $a$ of the pan A, and adapted to be connected at its opposite end to the flange by a hook, $c$.

D is a wood cylinder or supplemental handle, with one end having an aperture or socket, $d$, and a transverse slot, $d'$, intersecting the aperture. The aperture or socket $d$ receives the extreme end of the crank or handle of the roasting-cylinder shaft $b$, to permit of the application of the supplemental handle to the shaft, to protect and prevent the burning of the hand by the shaft. The transverse slot $d'$ in the handle receives the lip $b^2$ of the lid or slide $b'$, when it is desired to apply it thereto, and permits of the ready opening and closing of the slide without danger of burning the hand.

Having thus fully described my invention, I claim and desire to secure by Letters Patent—

The handle D, having socket $d$ to receive the end of the crank $b$, and transverse slot $d'$ to receive the lip $b^2$ of the sliding door, combined with said crank and door, and with the cylinder B, to perform the two functions described, as herein specified.

In testimony that I claim the foregoing as my own I have hereto affixed my signature in presence of two witnesses.

HENRY A. LEHER.

Witnesses:
HENRY THIESSEN,
GEORGE KUENGEL.